Figure 1:
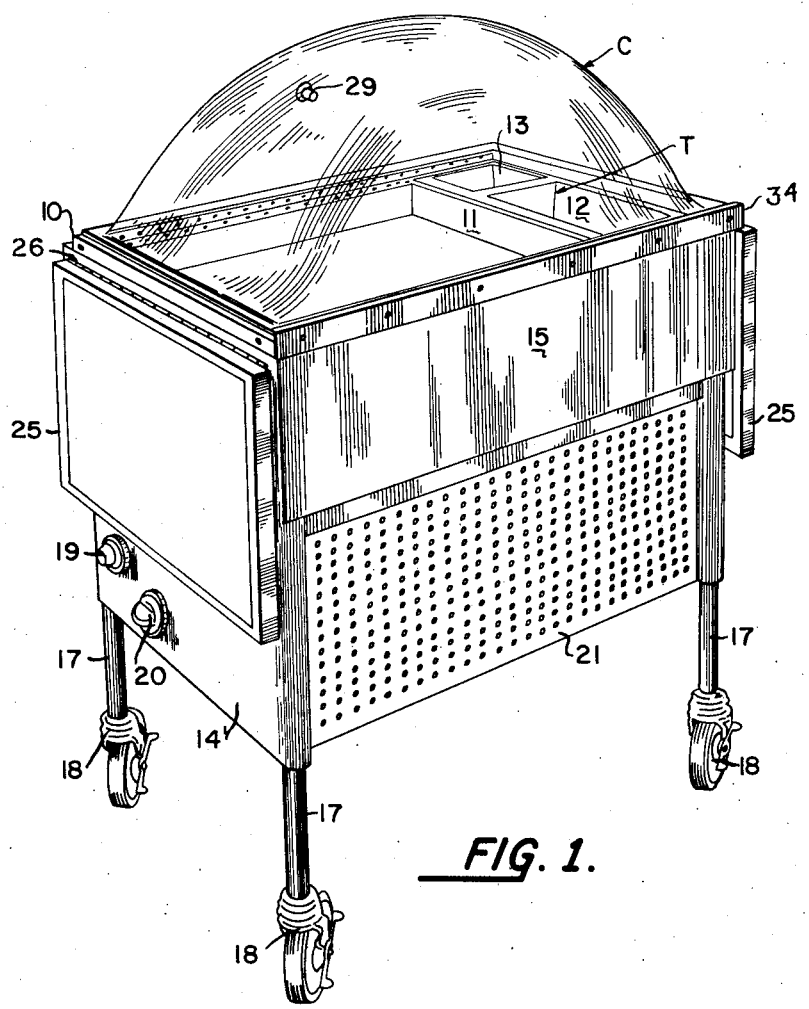

June 12, 1962  V. D. MOLITOR  3,038,986
DISPLAY DEVICE FOR HEATED FOOD
Filed March 17, 1958  4 Sheets-Sheet 1

INVENTOR.
VICTOR D. MOLITOR
BY
Horace B. Van Valkenburgh
ATTORNEY

June 12, 1962 V. D. MOLITOR 3,038,986
DISPLAY DEVICE FOR HEATED FOOD

Filed March 17, 1958 4 Sheets-Sheet 2

INVENTOR.
VICTOR D. MOLITOR
BY
Horace B. Van Valkenburgh
ATTORNEY

June 12, 1962 V. D. MOLITOR 3,038,986
DISPLAY DEVICE FOR HEATED FOOD
Filed March 17, 1958 4 Sheets-Sheet 3

INVENTOR.
VICTOR D. MOLITOR
BY
ATTORNEY

June 12, 1962  V. D. MOLITOR  3,038,986
DISPLAY DEVICE FOR HEATED FOOD
Filed March 17, 1958  4 Sheets-Sheet 4

INVENTOR.
VICTOR D. MOLITOR
BY
Horace B. Van Valkenburgh
ATTORNEY

United States Patent Office 3,038,986
Patented June 12, 1962

3,038,986
DISPLAY DEVICE FOR HEATED FOOD
Victor D. Molitor, Englewood, Colo.
(1318 10th St., Denver, Colo.)
Filed Mar. 17, 1958, Ser. No. 721,792
7 Claims. (Cl. 219—35)

This invention relates to display devices for heated food, such as food carts in which food is to be displayed and maintained in heated condition.

For the ultimate promotion of the sale of food, as in a restaurant, it is highly desirable to display the food so that the customer will be able to see the food which is to be served. Food which is displayed in a tasty and appetizing manner will result in increased sales and a greater degree of satisfaction on the part of the customer. For this purpose, it is desirable to be able to display the food before serving, but for sanitary reasons, adequate means must be provided to avoid contamination, as through sneezing, coughing or the like by the various customers. The restaurant owner is, of course, responsible for employing help which is free from disease and clean, but cannot control the actions of the customers. In the case of steam tables and the like, as in cafeterias, provision is usually made for a relatively high counter, between the customers and the display of food, which is introduces delays and difficulties in the serving of the food. When the customer is seated at a table, as in a restaurant, the food is best displayed by placing it on a mobile cart which may be brought to the customer's table, but the food must be covered or shielded from contamination, both while the cart is being wheeled about the room and also while it is being served. A cart whose top is provided with a shield or cover which may be raised to a generally upright position and stay in that position while the food is being served, may be brought right next to the table of the customer, permitting the customer to closely inspect the food through the shield or cover, but preventing contamination. For adequate display, such a shield or cover for food must be transparent and preferably without optical distortion, for which purpose the shield or cover disclosed in my copending application Serial No. 721,780, filed March 17, 1958, is particularly advantageous. While food which must be served hot, such as roasts and other meats, vegetables, soups, gravies, and the like, may be maintained in heated condition without undue difficulty, whenever a transparent shield is placed over such food, certain difficulties arise. Since the shield or cover is subjected to room temperature on the upper surface or outside, particularly when in closed position over the food, moisture or water vapour rising from the heated food tends to condense on the underside of the shield or cover. Such condensation of moisture not only clouds the transparent shield or cover, thus rendering the view of the food obscure, but also tends to deplete the moisture necessary to maintain the food in the best edible condition, so that the food may become dry and considerably less tasty. Also, if sufficient moisture is maintained about the food to compensate for condensate on the underside of the shield or cover, the food tends to become more moist than desirable and eventually wet and soggy.

Among the objects of this invention are to provide a novel display device, such as a mobile cart, for displaying and serving heated foods; to provide such a device which is provided with a transparent shield or cover, but in which the problems due to moisture condensation on the underside of the cover are overcome; to provide such device in which such problems may be overcome, irrespective of the temperature at which the food is maintained; to provide such a device which may be readily constructed; and to provide such a device, particularly a mobile cart, which will be efficient and effective in operation.

Figure 2:
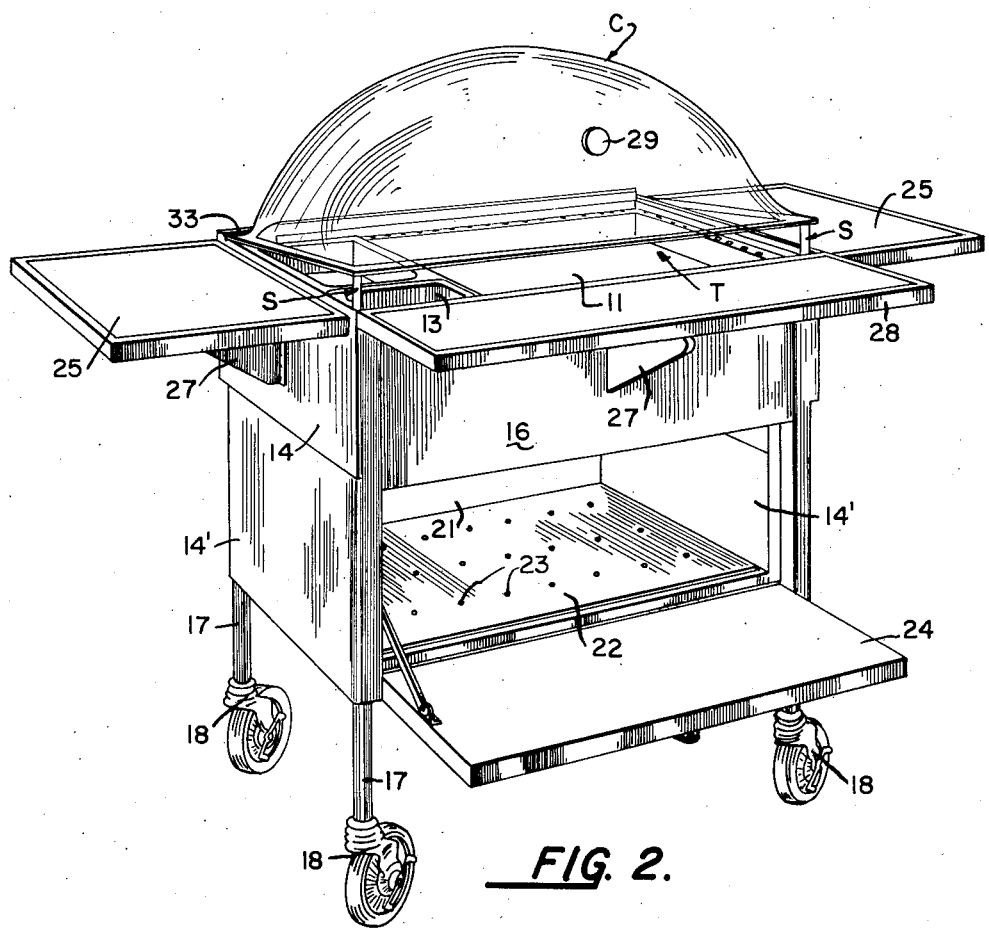
Figure 3:
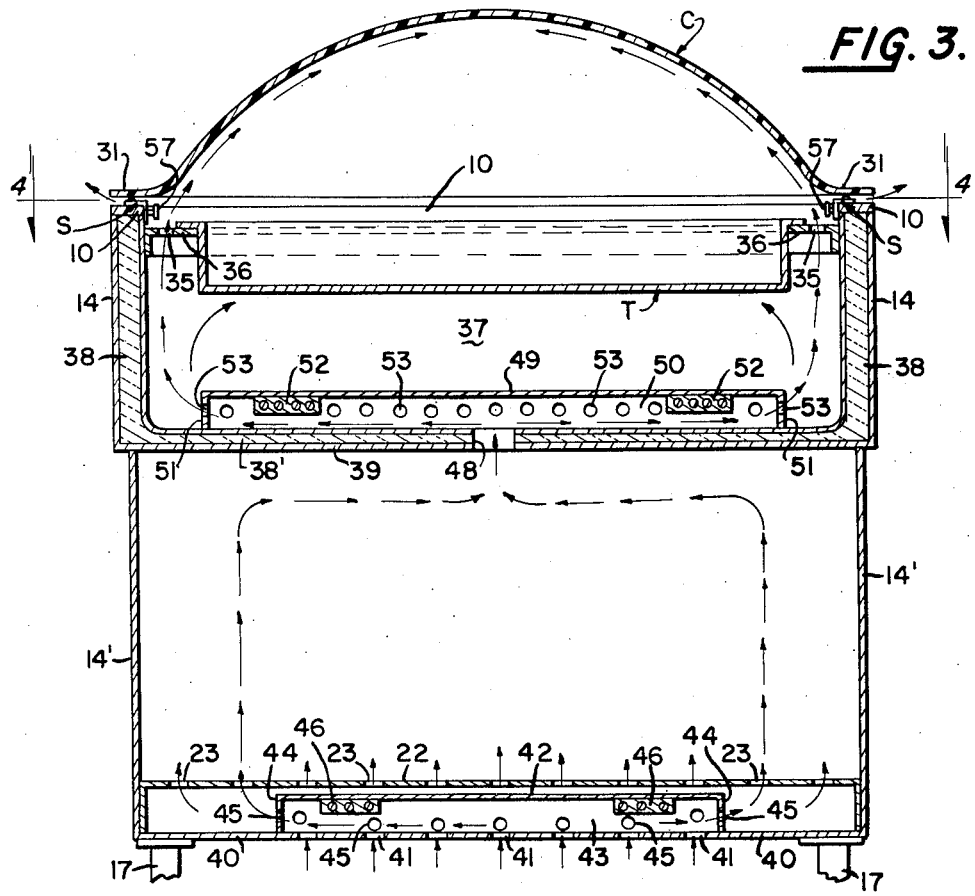
Figure 4:
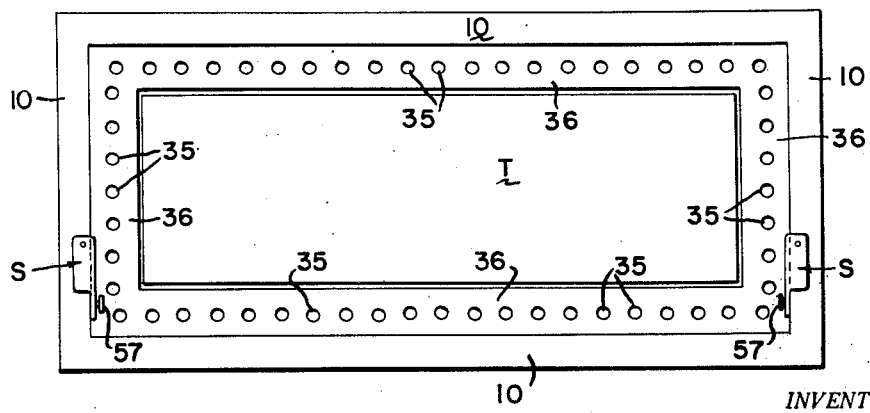
Figure 7:
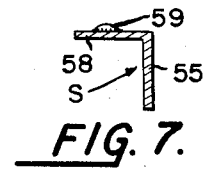
Figure 5:
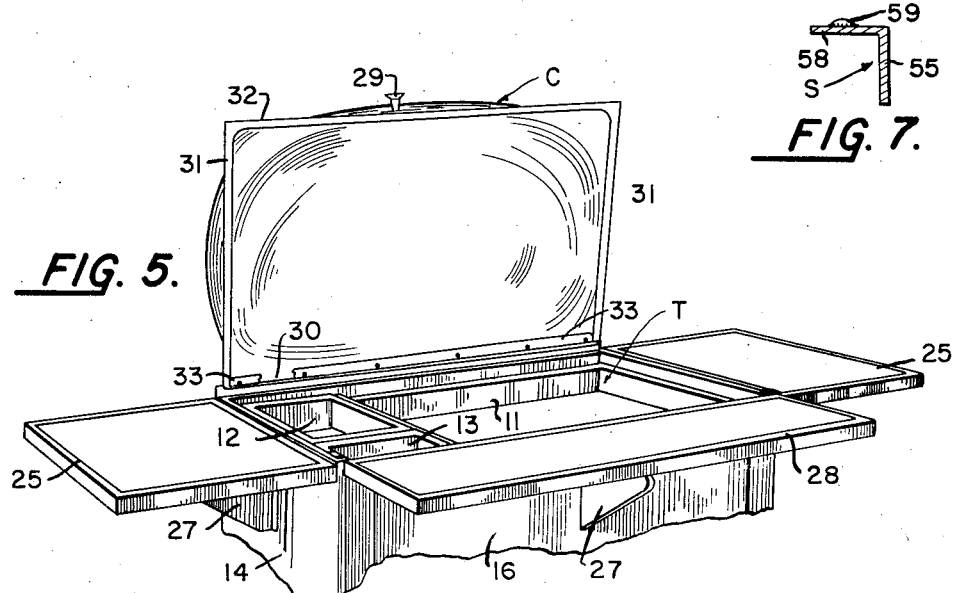
Figure 6:
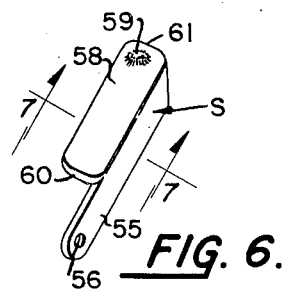
Figure 8:
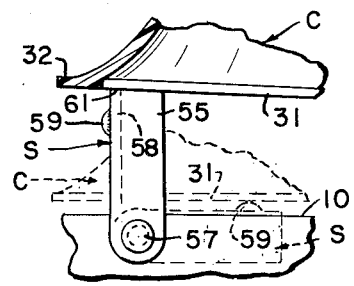
Figure 9:
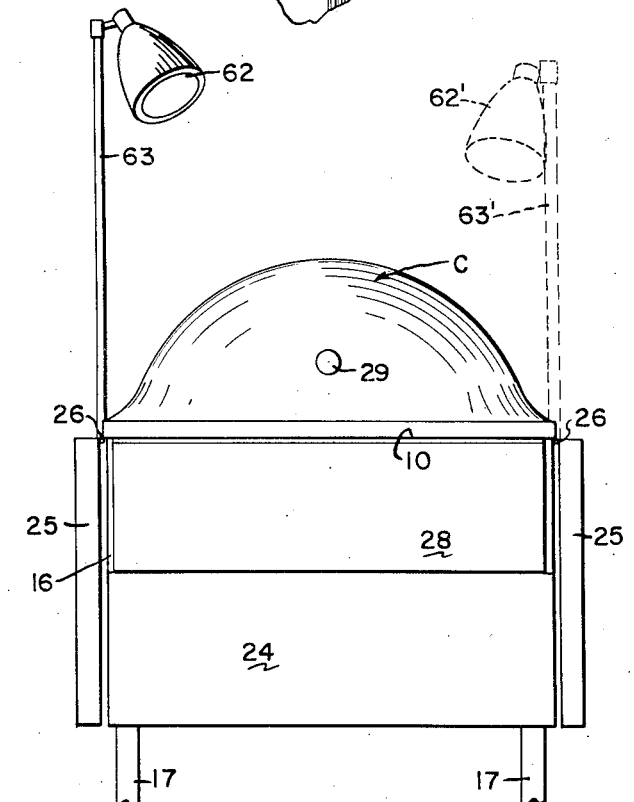

Additional objects and the novel features of this invention will become apparent from the description which follows, taken in connection with the accompanying drawings, in which:

FIG. 1 is a front perspective view of a mobile food cart embodying the principles of this invention;
FIG. 2 is a rear perspective view of the cart of FIG. 1;
FIG. 3 is a vertical, lateral cross section of the principal parts of the cart of FIGS. 1 and 2;
FIG. 4 is a top plan view, looking downwardly from the position of line 4—4 of FIG. 3, beneath a transparent cover or shield;
FIG. 5 is a fragmentary, rear perspective view, similar to FIG. 2 but showing the transparent shield or cover in upper or raised position;
FIG. 6 is an exploded perspective view, on an enlarged scale, of a stop which is also shown in FIGS. 2–4;
FIG. 7 is a cross section of the stop, taken along line 7—7 of FIG. 6;
FIG. 8 is an enlarged, fragmentary side elevation, partly in section, looking outwardly toward the stop when in the raised position of FIG. 2; and
FIG. 9 is a rear elevation of a mobile cart illustrating an alternative embodiment of this invention.

As illustrated in FIGS. 1 and 2, a mobile cart which embodies the principles of this invention invention may include a shield or cover C mounted on a hollow, rectangular top 10, so as to enclose a tray T, which may be provided with removable receptacles of different dimensions and depths, so as to be adapted to receive various types of foods, such as roasts or the like in a pan 11, and vegetables, soups, gravies or the like in wells 12 and 13. The cart may also be provided with sides 14 having rearwardly offset lower portions 14' and upper front and rear panels 15 and 16, respectively, the sides and upper panels conveniently being imperforate. The cart may be supported by legs 17, disposed at the four corners thereof, each leg conveniently being provided with a wheeled caster 18 at its lower end for mobility and the legs 17 being adjustable in height, if desired. Rheostat or switch controls 19 and 20 may be mounted on the lower portion 14' of one side, as in FIG. 1, for regulating the heating effect and consequently the temperatures produced by heating elements referred to latter. A panel 21, such as provided with indentations for decorative purposes, may be disposed beneath the upper front panel 15, while a warming shelf 22 may extend rearwardly from the lower edge of panel 21 and may be provided with holes 23 for a purpose described later. A hinged door 24 may be disposed beneath upper rear panel 16 to permit access to the warming shelf 22, on which may be stored dishes for serving of the food contained in tray T. The cart may also be provided with side shelves 25, each attached by a hinge 26 to the respective side of top 10 and adapted to be supported in raised position by a pivoted bracket 27, as in FIG. 2. A rear shelf 28 may be similarly attached to the rear of top 10 by a hinge and may be supported in raised position by a pivoted bracket 27, as in FIG. 2. The cover C may be provided with a handle or knob 29, to facilitate movement of the same between the position of FIGS. 1, 2 and 5. Aside from the cover C, the cart is preferably constructed of material or combinations of materials, such as stainless steel, bronze, brass, or others, which are resistant to corrosion and may be readily maintained in clean condition.

As will be evident, the cart may be wheeled to the customer's table with the shelves 25 and 28 down and the door 24 closed, with one or more of the shelves being raised and door 24 opened when necessary, when the desired location at the customer's table is reached. During such movement, the cover C may be in the substantially closed position of FIG. 1, or the slightly raised position of FIG. 2, while when the customer's table is reached, the cover C may be moved to the generally upright, raised position of FIG. 5, in each of which positions the customer may view the food and thus be able to indicate which of the foods on tray T is desired, if not preselected, whereupon the desired foods may be served.

The cover C may comprise a plastic bubble formed so as to be substantially devoid of optical distortion, as in the manner of my application Serial No. 721,780, and integral around its edges, as in FIG. 5, with a front flange 30, side flanges 31 and a rear flange 32. The cover C may be the connected by a hinge 33 attached to the front flange 30 and to the front edge of top 10, a stop 34, as in FIG. 1, preferably being provided to maintain the cover C in the raised position of FIG. 5, the stop 34 being either integral with or separate from the hinge 33, as in my application Serial No. 721,780.

In accordance with the present invention, the cover C is maintained in a heated condition, as by heated air directed thereagainst and passing along the underside thereof, as indicated by the arrows of FIG. 3, the heated air being directed upwardly against the undersurface of the cover C from all sides of the periphery thereof, through holes 35 in a ledge 36, shown also in FIG. 4, which supports the tray T, as in FIG. 3. While the tray T is shown in FIGS. 3 and 4 as being a single pan, it will be understood that it may be made in a conventional manner and thus be provided with longitudinal and/or transverse ribs, to support individual pans or wells, such as shown in FIGS. 1 and 2. As in FIG. 3, the upper portion of the cart may be formed to provide a heating compartment 37, as by the upper portions of the sides 14 and the upper panels 15 and 16 being double walled and provided with insulation 38 between the walls, with a bottom 39 of the heating compartment 37 also being double walled and provided with insulation 38' between the walls. Conveniently, the double walls of bottom 39 may be integral with the double walls of the upper portion of sides 14 and the front and rear upper panels 15 and 16, respectively, while top 10 may be attached across the upper edges of the double walls of the upper portions of the sides 14 and the front and rear panels 15 and 16. As indicated previously, the space above the shelf 22 forms a warming compartment, for the purpose previously described, while the shelf 22 may be spaced above the bottom 40 of the cart, conveniently provided with holes 41 over a central area thereof corresponding to an inverted, box-shaped structure having a top 42, sides 43 and ends 44. Each of the sides 43 and ends 44 are provided with a series of spaced holes 45, so that air entering holes 41 in the bottom 40, as indicated by the arrows of FIG. 3, will be heated by electrical heating elements 46, controlled by rheostat or multiple position switch 20 of FIG. 1, then will flow outwardly through holes 45 and upwardly through holes 23 into the warming compartment.

In further accordance with this invention, the bottom 39 of the heating compartment 37 is provided with a central aperture 48, although more than one aperture may be provided if desired, but the apertures, if more than one, are confined to the area beneath an inverted, box-shaped structure having a top 49, sides 50 and end 51 in which electrical heating elements 52, controlled by rheostat or switch 19 of FIG. 1, are mounted. As will be evident, the air within this box-shaped structure will be heated by heating elements 52 and will flow outwardly through holes 53 in the sides and ends 50 and 51 thereof. This heated air will not only maintain the tray T and the food therein heated to the desired temperature, as controlled by the rheostat or multiple position switch 19, but will also pass upwardly through holes 35 in ledge 36 to maintain the underside of the cover C sufficiently heated to avoid the condensation of moisture thereon. Moisture arising from heated food and steam are considered equivalents, for the purpose of the present invention.

In further accordance with this invention, stop means are provided to maintain the rear flange 32 and side flanges 31 of the cover C slightly spaced from top 10, as in FIG. 3, or a greater distance from the top, as in FIG. 2. Such stop means may be constructed in a manner similar to stop S of FIGS. 6 and 7, which is provided with a side flange 55 having a hole 56 through which a screw 57 of FIGS. 3 and 4 may extend, to attach the stop S for pivotal movement to each side of top 10, adjacent the rear edge of the latter. Stop S may also be provided with a top flange 58 having a button 59, such as formed by dimpling or punching slightly from the underside. In the position of FIGS. 2 and 3, the top flange 58 of each stop S lies against the upper surface of the respective side of the top 10 and maintains the side flanges 31 and rear flanges 32 of the cover C slightly spaced from the top 10, as also indicated in dotted lines in FIG. 8. In order to maintain the underside of the cover C heated to the desired degree, i.e., sufficient to prevent condensation but insufficient to cause the plastic of the cover to be overheated, it has been found desirable to permit sufficient egress of air, corresponding generally to the amount of heated air being discharged against the top through the holes 35 in ledge 36. Thus, when the temperature of the tray T and the food therein is maintained at a relatively lower temperature, the side and rear flanges of the cover C may be spaced from the top 10 a relatively small distance, which is provided by the side flanges 31 resting on the button 59. However, when the tray T and the food therein is to be maintained at a higher temperature, such as around 205° F., or when the relative humidity in the room in which the cart is being used is relatively high, it is desirable to permit the egress of a greater amount of air, primarily because the heating elements 52 will be adjusted to produce more heat and there will consequently be a greater amount of heated air passing, by convection, through holes 35. For this purpose, each stop S may be merely raised to the upper position, shown in FIG. 2 and shown in full in FIG. 8. In this position, the inner end 60 of top flange 58 of the stop will rest upon the top 10, while side flanges 31 of cover C will rest upon outer end 61 of top flange 58, which is conveniently rounded for that purpose. Thus, both button 59 and outer end 61 of the top flange 58 of each stop S are both preferably rounded, to avoid marring or scratching the underside of side flanges 31 of cover C. Conveniently, the inner end of top flange 58 of each stop S is spaced a sufficient distance from hole 56, so that each stop S may be moved rearwardly slightly past center to engage the respective side of top 10, as in FIG. 8, to maintain stop S in its upright position.

In the alternative embodiment of this invention illustrated in FIG. 9, cover C and other parts of the cart may be provided as described previously, except that holes 35 in ledge 36 may be eliminated or reduced in number and heat supplied to cover C by one or more infra-red or heat lamps 62 or 62', each mounted on an adjustable standard 63 or 63', which is conveniently mounted on a front corner of the cart. The heat lamps are preferably adjusted so as to direct heat rays against cover C. Thus, when only one heat lamp is used, it may be substantially centered toward cover C, as in the case of lamp 62, but when a pair of heat lamps are used, each may be directed towards the cover C, on opposite sides of the center thereof, similar to heat lamp 62'. When using the heat lamps, it is still desirable to permit the egress of a certain amount of air from beneath cover C, although normally less than when heated air is being discharged against the underside of the cover. Thus, the position of the stops S shown in FIGS. 3 and 4 and in dotted lines in FIG. 8 will usually suffice when the heat lamps are used, although if the humidity of the room in which the cart or other device is being used is relatively high, it may be necessary to raise the stops to the full position of FIG. 8. Of course, the heat provided by the heat lamps will tend to produce heated air beneath the cover C, but the heating of the cover will, when the heat lamp or lamps are properly adjusted and controlled, prevent condensation of moisture on the underside of cover C, thereby maintaining the visual properties and permitting undistorted vision therethrough.

From the foregoing, it will be evident that this invention accomplishes to a marked degree the requirements and objects hereinbefore set forth. By discharging heated air against the underside of a transparent, plastic cover, undersired condensation of moisture may be prevented. Also, by heating the cover by heat lamps or the like, the same desired results may also be accomplished. By the use of adjustable stop means, the construction of which may be varied considerably from the stops S shown and described, overheating of the plastic of the cover may be avoided, by permitting egress of a sufficient amount of air from around the edges of the cover. Also, the position of the cover with a corresponding control of the amount of air permitted to be discharged, may be controlled so as to correspond with the temperature to which the food and the food trays are heated, and/or the relative humidity of the surroundings.

It will be understood, of course, that the principles of this invention may be embodied in a so-called steam table. For instance, the upper portion of the cart, as shown in FIG. 3, and primarily the heating compartment 37 and the insulated walls thereof, together with the heating elements 52 and the box-shaped structure enclosing the same, the tray T, either as shown in FIG. 3 or as in FIGS. 1 and 2, or any other conventional tray, pan, well or the like, and the plastic cover C, may be installed in stationary position, as in a cafeteria. As will be evident, in such an installation, the underside of cover C may be maintained sufficiently heated that condensation of moisture is avoided. Also, suitable stop means may be provided to permit adjustment of the cover for the egress of an amount of air corresponding to the conditions involved. The embodiment of FIG. 9 may similarly be utilized for a stationary display device for heated food.

Although certain embodiments of this invention have been illustrated and described, it will be understood that other embodiments may exist and that various changes and modifications may be made therein, all without departing from the spirit and scope of this invention.

What is claimed is:

1. A display device for heated food, comprising a substantially closed heating compartment; receptacle means disposed within said compartment for containing food; heating means beneath said receptacle means and in said compartment for supplying heat directly to said receptacle means; a transparent cover extending over a greater area than said receptacle means, said cover being normally disposed above said receptacle means but movable to a position for access to said receptacle means, said food when heated tending to produce heated moisture and said cover tending to produce condensation of said heated moisture on the under side thereof; a support for said receptacle means, said support having passages disposed outwardly of said receptacle means but within the area covered by said cover to permit the passage of heated air from said heating means beneath said receptacle means to flow upwardly along the inside of said cover, thereby maintaining the inside of said cover at a sufficient temperature to minimize said condensation; and stop means for positioning said cover in different open positions so that various amounts of air are permitted to discharge from at least a portion of the periphery of said cover.

2. A display device for heated food, as defined in claim 1, wherein said stop means includes a member mounted for adjustment to different positions and engaging the underside of said cover to maintain said cover in different angular relationships to said receptacle means.

3. A display device for heated food, comprising receptacle means for containing food; a support for said receptacle means and providing a surface surrounding said receptacle means; heating means beneath said receptacle means for supplying heat to said receptacle means; a transparent cover extending over a greater area than said receptacle means, said cover being mounted for pivotal movement on one edge of said surface to a position for access to said receptacle means, said food when heated tending to produce heated moisture and said cover tending to produce condensation of said heated moisture on the underside thereof, and said support having passages disposed outwardly of said receptacle means to permit the passage of heated air from said heating means beneath said receptacle means to flow upwardly along the inside of said cover, thereby maintaining the inside of said cover at a sufficient temperature to minimize said condensation; and a pair of stop members, each pivotally mounted on said surface at a position opposite the point of pivotal attachment, each said member having a side flange pivoted on said surface and a top flange disposed perpendicularly to said side flange and adapted in one position to lie against said surface and in another position to be disposed in a generally upright position with the then lower end of said top flange engaging said surface and the then upper end of said top flange engaging the under side of said cover.

4. A display device for heated food, as defined in claim 3, wherein said top flange of each said member of said stop means is provided with a rounded end adapted to engage the underside of said cover and with a rounded surface portion which extends upwardly and engages the underside of said cover when said top flange lies against the upper surface of said surface means.

5. A display device for heated food, comprising a mobile cart having a hollow, rectangular top; a heating chamber having insulated walls extending downwardly from said top and an insulated bottom disposed in spaced relation to said top; a rectangular ledge extending inwardly from said walls and beneath said top, said ledge having a plurality of apertures therein; receptacle means for food supported by said ledge; a transparent cover formed of plastic and having side and end flanges corresponding to said top, the portion of said cover within said flanges being concave on the underside and the rear flange of said cover being pivotally mounted on the rear edge of said top; a perforated panel extending downwardly from the rear wall of said heating chamber; an imperforate panel extending downwardly from each side wall of said heating chamber; an access door disposed beneath said front wall of said heating chamber; a shelf having a plurality of apertures therein disposed in spaced relation to and beneath said bottom wall of said heating chamber; a bottom plate disposed in spaced relation to and beneath said shelf, said bottom plate extending between the lower edges of said side panels; a first box-shaped structure having a top disposed in spaced relation to said bottom of said heating chamber and side and end walls extending downwardly from said structure top to said bottom of said heating chamber, said structure side and end walls being provided with a plurality of apertures; at least one heating element within said first box-shaped structure, said bottom of said heating chamber being provided with at least one aperture within the confines of said first box-shaped structure; a second box-shaped structure disposed within the space between said bottom panel and said shelf and having an imperforate top and side and end walls depending from said top to said bottom panel, said structure side and end walls having a plurality of apertures therein; at least one heating element disposed within said second box-shaped structure, said bottom panel having a plurality of apertures therein within the confines of said second box-shaped structure; and means for individually controlling each of said heating elements in said first and second box-shaped structures.

6. A display device for heated food, comprising a mobile cart having a centrally hollow rectangular top; receptacle means for food which upon heating tends to produce steam; means for supporting said receptacle means adjacent said top; a heating chamber having insulated walls extending downwardly from said top and an insulated bottom disposed in spaced relation to and beneath said receptacle means; a transparent, plastic cover having side, front and rear flanges and a portion within said flanges which is concave on the underside, said cover being pivotally mounted on the front of said top and tending to produce condensation of steam on the inside thereof; means for maintaining said cover with said side and front flanges spaced above the corresponding portions of said top at a plurality of positions; a box-shaped structure having a top disposed in spaced relation to said bottom of said heating chamber and side and end walls extending downwardly from said structure top to said bottom of said heating chamber, said structure side and end walls having a plurality of apertures therein; at least one electrical heating element disposed within said box-shaped structure, said bottom of said heating chamber having at least one aperture therein disposed within the confines of said box-shaped structure; means for controlling said heating element; a vertically adjustable, upright standard disposed at one front corner of said top; and a heat lamp adjustably mounted on the upper end of said standard to direct heat rays against said cover to maintain the inside of said cover at a sufficient temperature to minimize such condensation.

7. A display device for heated food, as defined in claim 6, including a second upright, vertically adjustable standard disposed at the opposite front corner of said top; and a heating lamp adjustably mounted on the upper end of said second standard.

References Cited in the file of this patent

UNITED STATES PATENTS

| | | |
|---|---|---|
| 931,142 | Perkins et al. | Aug. 17, 1909 |
| 1,800,863 | Johnson | Apr. 14, 1931 |
| 1,823,152 | Larson | Sept. 15, 1931 |
| 1,902,132 | Klapper | Mar. 21, 1933 |
| 1,917,141 | Middleton | July 4, 1933 |
| 1,982,073 | Sawin | Nov. 27, 1934 |
| 2,070,663 | Klein et al. | Feb. 16, 1937 |
| 2,072,428 | Parise | Mar. 2, 1937 |
| 2,201,696 | Lucas | May 21, 1940 |
| 2,458,190 | Newburger | Jan. 4, 1949 |
| 2,566,453 | Ketay | Sept. 4, 1951 |

FOREIGN PATENTS

| | | |
|---|---|---|
| 493,231 | Italy | Apr. 20, 1954 |